United States Patent
Heo et al.

(10) Patent No.: US 9,910,136 B2
(45) Date of Patent: Mar. 6, 2018

(54) SYSTEM FOR FILTERING LIDAR DATA IN VEHICLE AND METHOD THEREOF

(71) Applicant: Hyundai Motor Company, Seoul (KR)

(72) Inventors: Myung Seon Heo, Seoul (KR); Byung Yong You, Gyeonggi-do (KR); Young Chul Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 518 days.

(21) Appl. No.: 14/576,265

(22) Filed: Dec. 19, 2014

(65) Prior Publication Data
US 2016/0103208 A1 Apr. 14, 2016

(30) Foreign Application Priority Data
Oct. 14, 2014 (KR) .................. 10-2014-0138508

(51) Int. Cl.
G01B 5/02 (2006.01)
G01S 7/48 (2006.01)
G01S 17/93 (2006.01)
G01S 17/89 (2006.01)

(52) U.S. Cl.
CPC ............ *G01S 7/4808* (2013.01); *G01S 17/89* (2013.01); *G01S 17/936* (2013.01)

(58) Field of Classification Search
CPC ....... G01S 7/4808; G01S 17/89; G01S 17/936
See application file for complete search history.

(56) References Cited

U.S. PATENT DOCUMENTS 8,126,642 B2 * 2/2012 Trepagnier ............ G01S 17/023
                                                          180/167
9,633,564 B2 * 4/2017 Ferguson ............... G08G 1/166
(Continued)

FOREIGN PATENT DOCUMENTS

JP       H09292464 A      11/1997
JP       2014-071026 A     4/2014
(Continued)

OTHER PUBLICATIONS

"Noise Analysis and Emulator Development of Radar/Lidar Sensors for Pre-Crash Safety HILS System", KACC (2009) pp. 109-114, English Abstract.
(Continued)

*Primary Examiner* — Pho M Luu
(74) *Attorney, Agent, or Firm* — Mintz Levin Cohn Ferris Glovsky and Popeo, P.C.; Peter F. Corless

(57) ABSTRACT

A system and method for filtering LiDAR data is provided. The system includes a LiDAR data collector that is configured to collect the LiDAR data from a LiDAR and store the LiDAR data in a matrix structure. A noise point determiner is configured to determine whether a first filtering condition for determining whether a point within a predetermined reference distance in the LiDAR data is present, a second filtering condition for determining whether a present point adjacent to a left and right by a reference of a reference point in the matrix structure is a first reference value or less, and a third filtering condition for determining whether a present point adjacent to a top and bottom by the reference of the reference point is a second reference value or less are satisfied.

8 Claims, 6 Drawing Sheets

(56) References Cited

U.S. PATENT DOCUMENTS

2013/0230206 A1* 9/2013 Mendez-Rodriguez G01S 17/89
 382/103
2015/0120244 A1* 4/2015 Ma ......................... G01C 15/00
 702/172
2016/0014395 A1* 1/2016 Murray ................... G01S 17/89
 348/42

FOREIGN PATENT DOCUMENTS

| KR | 10-1079359 B1 | 11/2011 |
| KR | 10-1285131 B1 | 7/2013 |
| KR | 10-1404655 B1 | 6/2014 |

OTHER PUBLICATIONS

"The Study on Road Extraction Using LIDAR data" (Aug. 2005) English Abstract, 72 pages.

* cited by examiner

SYSTEM FOR FILTERING LIDAR DATA IN VEHICLE AND METHOD THEREOF

CROSS-REFERENCE TO RELATED APPLICATION

This application is based on and claims priority from Korean Patent Application No. 10-2014-0138508, filed on Oct. 14, 2014 in the Korean Intellectual Property Office, the disclosure of which is incorporated herein in its entirety by reference.

BACKGROUND

Field of the Invention

The present invention relates to a system that filters LiDAR (Light Detection And Ranging) data and a method thereof, and more particularly, to a technology that eliminates a snow or rain point from data measured by a LiDAR.

Description of the Prior Art

Recently, a LiDAR system being actively used in a variety of areas is operated as a form combined with advanced equipment such as an aircraft, laser scanner, GPS (Global Positioning System), INS (Inertial Navigation System) and the like. The LiDAR system may be classified into an air LiDAR system and a ground LiDAR system based on the operating method. These LiDAR systems may accurately obtain a three-dimensional coordinate for each of constant spot sizes. In addition, the LiDAR systems have the advantages of being efficient and economical compared to the existing aerial photogrammetry and may effectively obtain digital elevation data and geometric information, etc. of the observation area.

In particular, to determine the front obstacle of a vehicle for a vehicle safety system such as vehicle autonomous driving, etc., a more accurate LiDAR system than an ultrasonic wave, radar, etc. has been utilized recently. However, the LiDAR data includes all objects within the measurement range, and snow or rain, etc. is not an obstacle, and thus may be misidentified as a particular object. Similarly, when snow or rain is misidentified as an obstacle, an incorrect operation of the system within vehicle such as a vehicle autonomous driving system, etc. may occur, and thus stability of the vehicle running may decrease.

SUMMARY

An exemplary embodiment according to the present invention provides a system configured to filter LiDAR data and a method thereof capable of providing more accurate LiDAR data by eliminating a snow or rain point of LiDAR data.

A system for filtering LiDAR data according to an exemplary embodiment of the present invention may include: a LiDAR data collector configured to collect the LiDAR data from a LiDAR and store the LiDAR data in a matrix structure; and a noise point determiner configured to determine whether all of a first filtering condition for determining whether a point within a predetermined reference distance in the LiDAR data exists, a second filtering condition to determine whether an existed point adjacent to a left and right by a reference of a reference point in the matrix structure is a first reference value or less and a third filtering condition to determine whether an existed point adjacent to a top and bottom by the reference of the reference point is a second reference value or less are satisfied.

Additionally, the noise point determiner may be configured to determine the reference point satisfying the first filtering condition, the second filtering condition, and the third filtering condition as a noise point. The system may further include a noise point eliminator configured to eliminate the noise point in the LiDAR data. In the first filtering condition, the predetermined reference distance may be set within about 10 m from the LiDAR, and in the second filtering condition, the first reference value may be set to at least 1. In the third filtering condition, the second reference value may be set to at least 1.

A method for filtering LiDAR data according to the present invention may include: storing the LiDAR data in a matrix structure; determining whether a first filtering condition for determining whether a point exists within a predetermined reference distance in the LiDAR data is satisfied; determining whether a second filtering condition for determining whether an existed point adjacent to a left and right by a reference of a reference point in the matrix structure is a first reference value or less is satisfied, when the first filtering condition is satisfied; and determining whether a third filtering condition for determining whether an existed point adjacent to a top and bottom by the reference of the reference point is a second reference value or less are satisfied, when the second filtering condition is satisfied.

Additionally, the method may further include determining the reference point satisfying the first filtering condition, the second filtering condition, and the third filtering condition as a noise point. The method may further include eliminating the noise point in the LiDAR data. In the first filtering condition, the predetermined reference distance may be within about 10 m from the LiDAR, in the second filtering condition, the first reference value may be at least 1, and in the third filtering condition, the second reference value may be at least 1. The present technology may thus more effectively filter a snow or rain point from LiDAR data. In addition, the present technology may improve the reliability of the vehicle related system using LiDAR data by increasing the accuracy of LiDAR data.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
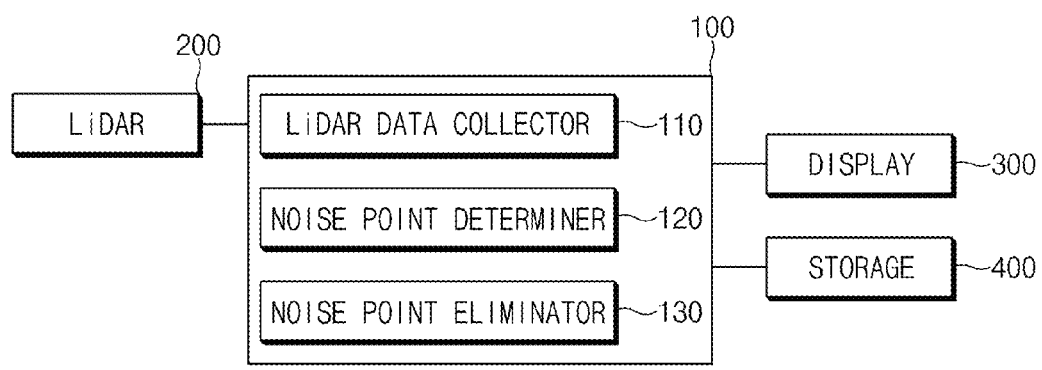
FIG. 1 is an exemplary configuration diagram of a system for filtering LiDAR data according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, to explain in detail to the extent that the ordinary skilled in the art can easily embody the technical concept of the present invention, the exemplary embodiments of the present invention will be described with reference to the accompanying drawings.

The present invention discloses a technology that may increase the reliability of LiDAR data by more effectively filtering a snow or rain point from the LiDAR data measured by a LiDAR. Hereinafter, with reference to FIG. 1 to FIG. 6B, exemplary embodiments of the present invention will be described in detail.

FIG. 1 is an exemplary configuration diagram of a system for filtering LiDAR data according to an exemplary embodiment of the present invention. A system for filtering LiDAR data according to the present invention may include a LiDAR filter 100, a LiDAR 200, a display 300 and a storage 400. The LiDAR filter 100, the LiDAR 200, the display 300, and the storage 400 may be operated by a controller having a processor and a memory.

The LiDAR filter 100 may be configured to filter a snow or rain point from the LiDAR data measured by the LiDAR 200. Accordingly, the LiDAR filter 100 may include a LiDAR data collector 110, a noise point determiner 120 and a noise point eliminator 130. The LiDAR data collector 110 may be configured to collect the LiDAR data which the LiDAR 200 measures for an object and store the data in a matrix structure. The LiDAR 200 may be configured to set the measurement conditions to FOV 100°, resolution 0.5° and 4 layers.

Figure 3:
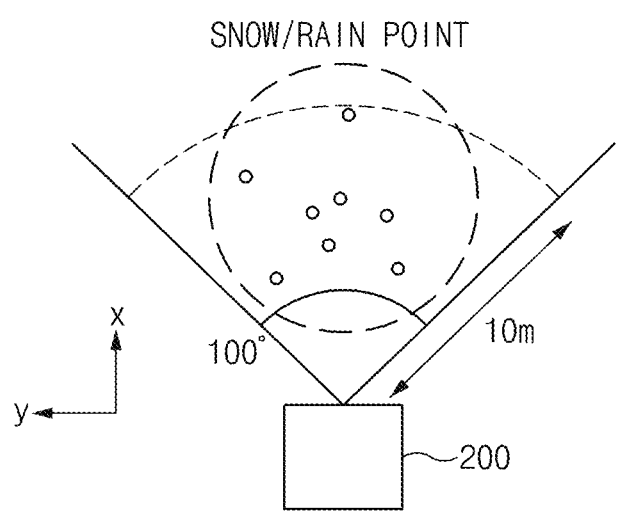
FIG. 3 is an exemplary diagram illustrating a first filtering condition according to an exemplary embodiment of the present invention.

Referring to FIG. 3, the interval between the measurement starting point and ending point of the LiDAR 200 may be 100°, and dividing the 100° by 0.5 is 200. In other words, the measurement may be performed by about 200 times for each 0.5° from the left to the right and thus the LiDAR data of 200 may be generated. Thus, the LiDAR data collector 110 may be configured to generate the matrix structure by 200 from the left to the right and 4 from the top to the bottom. In other words, the matrix structure may be stored as the form of 200*4. The data of each layer may be sorted from the left to the right. The noise point determiner 120 may be configured to determine whether the point of the LiDAR data satisfies the following 3 filtering conditions and determine that the data is a noise (e.g., snow or rain) point, when the following 3 filtering conditions are satisfied. First, the snow or rain point in the LiDAR data may exists within about 10 m of LiDAR 200 as shown in FIG. 3. Therefore, the noise point determiner 120 may be configured to determine whether the noise point exists within about 10 m from the LiDAR 200 in the LiDAR data.

Figure 4:
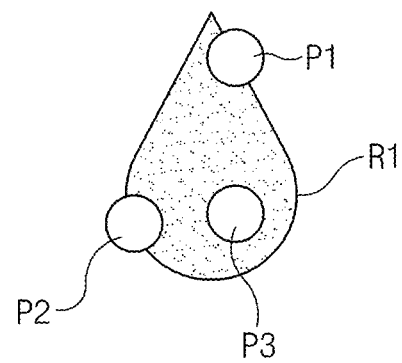
FIG. 4 is an exemplary diagram illustrating the number of point taken by a raindrop according to an exemplary embodiment of the present invention.
Figure 5:
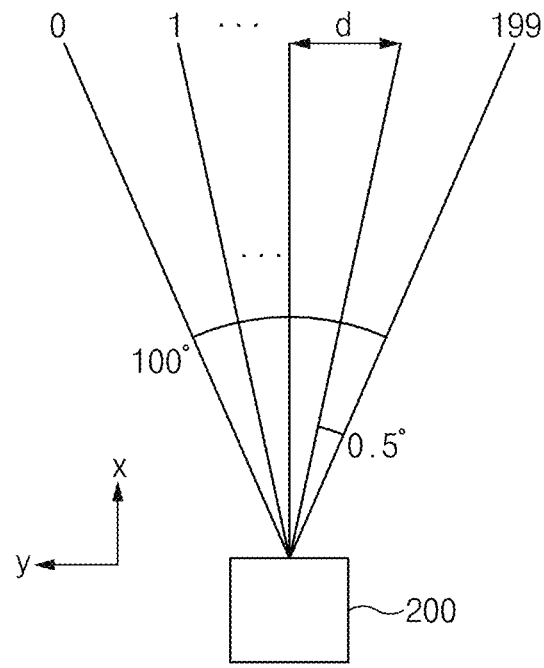
FIG. 5 is an exemplary diagram illustrating second and third filtering conditions according to an exemplary embodiment of the present invention.

Furthermore, for a general object, the number of points in a series of top and bottom and left and right is at least two or more. In other words, for the obstacle such as a vehicle, a person, etc., since object is greater than a raindrop or snow, at least two or more points may be displayed. As shown in FIG. 4, 3 points P1, P2 and P3 are marked for the raindrop R, and for a raindrop or snow, this noise may be composed of 2 or less points in the top and bottom or the left and right. In other words, the points of P1 and P3 may be present in the top and bottom for the raindrop R and the points of P2 and P3 may be present in the left and right. By the reference of the P2 point, at least 1 or less point P1 may be present in the top and bottom and at least 1 or less point P3 may be present in the left and right.

Second, whether the point existing within a substantially constant distance adjacent to left and right by the reference of a reference point is at least 1 or less in the LiDAR data may be determined. The adjacent constant distance may be about 0.5° interval as d in FIG. 4. Third, whether point existing within a substantially constant distance adjacent to top and bottom layers by the reference of a reference point is at least 1 or less in the LiDAR data may be determined. In particular, for 4 layers, by the reference of the second layer's point, the number of points existing between 1 layer and 3 layer may be determined.

Figure 6A:
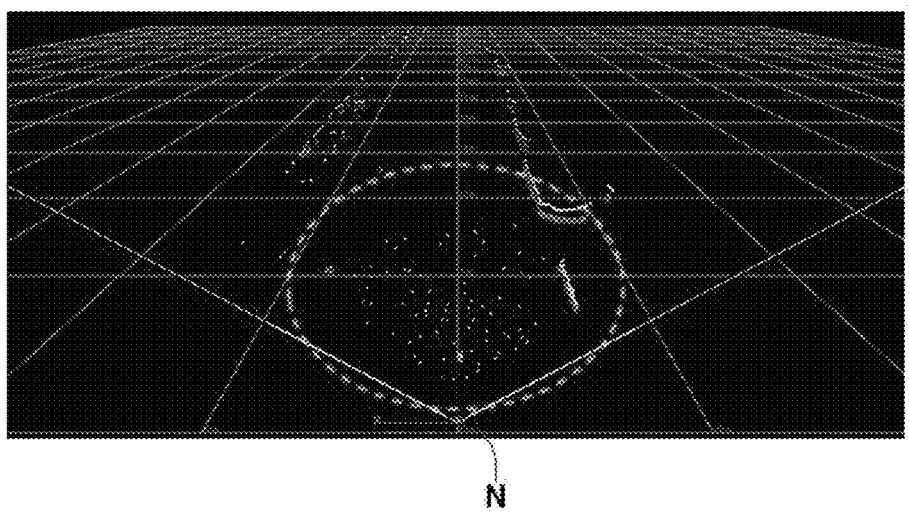
FIG. 6A is an exemplary diagram of LiDAR data including a noise point (snow or rain point) according to an exemplary embodiment of the present invention.
Figure 6B:
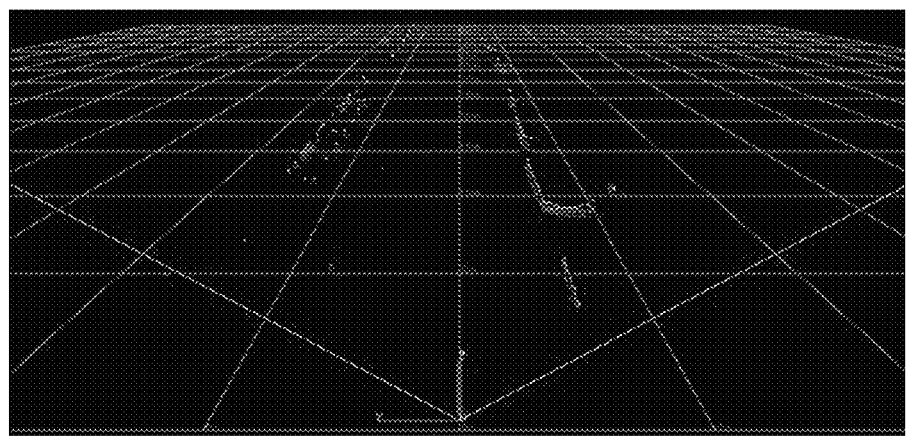
FIG. 6B is an exemplary diagram eliminating a noise point according to an exemplary embodiment of the present invention.

When the noise N is determined by the noise point determiner 120 as shown in FIG. 6A, the noise point eliminator 130 may be configured to eliminate the noise from the LiDAR data as shown in FIG. 6B. The LiDAR 200 may be a radar that uses a laser beam, and may be configured to transmit the LiDAR data measuring an obstacle of the vehicle front, etc. to the LiDAR filter 100. The display 300 may be configured to display the LiDAR data eliminating the snow or rain point on a screen. The storage 400 may be configured to store the LiDAR data collected from the LiDAR 200, and store the LiDAR data when the noise filtering is finished. Accordingly, the present invention may improve the accuracy of the LiDAR data by determining the noise (e.g., snow or rain) point determining whether the number of points in series of left and right, top and bottom is 1 or less, with the reference point as the center, when the point is present within about 10 m from the LiDAR in the LiDAR data, and eliminating the determined noise point.

Figure 2:
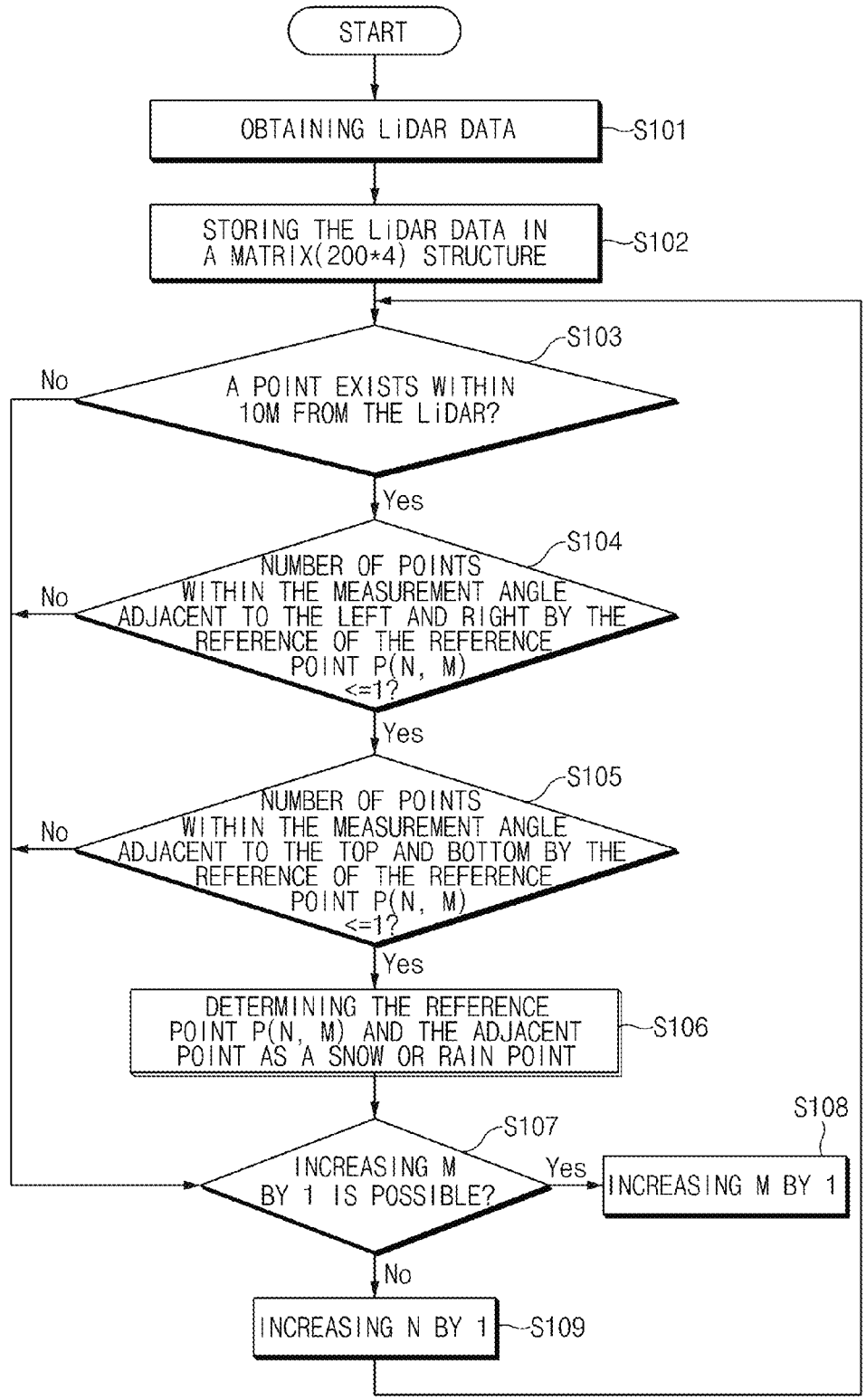
FIG. 2 is an exemplary flow chart showing a method for filtering LiDAR data according to an exemplary embodiment of the present invention.

Hereinafter, referring to FIG. 2, a method for filtering LiDAR data will be described in detail. First, the LiDAR data collector 110 may be configured to obtain the LiDAR data from the LiDAR 200 (S101), and store the LiDAR data in a matrix structure (S102). For example, the measurement conditions of the LiDAR 200 may be set to FOV 100°, resolution 0.5° and 4 layers, the matrix may be composed of 200*4 structure. Then, noise point determiner 120 may be configured to determine whether the point exists within about 10 m from the LiDAR 200 (S103), to determine that the point observed within maximum 10 m is a snow or rain point when the snow or rain point in the LiDAR data is observed within about 5 m or 10 m from the LiDAR 200.

Subsequently, the noise point determiner 120 may be configured to determine whether the number of the points existing within the measurement angle adjacent to the left and right by the reference of the reference point P(n, m) is 1 or less (S104). In other words, whether the number of the points positioned within points P(n, m+1), P(n, m+2), P(n, m−2), P(n, m−1) adjacent to the left and right for the reference point P(n, m) is 1 or less may be determined. Additionally, the noise determiner 120 may be configured to determine whether the number of the points existing within the measurement angle adjacent to the top and bottom by the reference of the reference point P(n, m) is 1 or less (S104). In other words, whether the number of the points positioned within points (n+1, m), P(n−1, m) adjacent to the top and bottom for the reference point P(n, m) is 1 or less may be determined.

As shown in FIG. 4, for a raindrop or snow, the point may be composed of 2 or less point. When the reference point is P3, the point P2 adjacent to the left is 1, and the point P1 adjacent to the top composed of 1. Thus, in the process S105, S106, whether the point adjacent to each of the left and right, the top and bottom with the reference point as the center is 1 or less may be determined. When the conditions of the above-mentioned process S104, S105, S106 are satisfied, the noise determiner 120 may be configured to determine the reference point and the adjacent point as a snow or rain point.

Furthermore, to determine the point next to the reference point, whether to increase m to 1 may be determined (S107), and m may be increased to 1 in response to the determination (S108), and the above-mentioned process S104-S106 may be repeatedly performed. In other words, when n is 0 to 3 and m is 0 to 199, when m is 198, the point may be increased by 1 and the above process S104-S106 for determining whether the 199$^{th}$ point is a noise point may be repeatedly performed, and when m is 199, since m cannot be further increased, n by may be increased by 1 (S109). When the reference point displayed in the LiDAR data satisfies of the three filtering conditions, the present invention may determine a noise point and determine whether the data of the matrix structure satisfy the three filtering conditions.

As shown in FIG. 6A, when the noise point N is determined, the noise eliminator 130 may be configured to provide the filtered LiDAR data by eliminating the noise point N as shown in FIG. 6B. Thus, the present invention may more effectively eliminate a noise point, especially, a snow or rain point from the LiDAR data and thus may enhance the accuracy of obstacle detection by reducing the probability which the snow or rain point is misunderstood as an obstacle. Accordingly, the present invention may improve the reliability of the vehicle system such as a vehicle autonomous driving system, a vehicle safety system and the like.

The preferred embodiment of the present invention as the above described is for purposes of illustration, through the spirit and scope of the appended claims, various modifications, changes, substitutions and the addition, change, etc. can be made by the ordinary skilled in the art, and it is construed that the following claims includes these modifications, variations, etc.

What is claimed is:

1. A system for filtering LiDAR (Light Detection And Ranging) data, comprising:
    a LiDAR data collector configured to collect the LiDAR data from a LiDAR and store the LiDAR data in a matrix structure;
    a noise point determiner configured to determine whether a first filtering condition for determining whether a point within a predetermined reference distance in the LiDAR data is present, a second filtering condition for determining whether a present point adjacent to a left and right by a reference of a reference point in the matrix structure is a first reference value or less, and a third filtering condition for determining whether a present point adjacent to a top and bottom by the reference of the reference point is a second reference value or less are satisfied, wherein the noise point determiner is configured to determine the reference point satisfying the first filtering condition, the second filtering condition, and the third filtering condition as a noise point;
    a noise point eliminator configured to eliminate the noise point in the LiDAR data; and
    a storage configured to store the LiDAR data when the noise point is eliminated.

2. A system for filtering LiDAR data according to claim 1, wherein in the first filtering condition, the predetermined reference distance is within about 10 m from the LiDAR.

3. A system for filtering LiDAR data according to claim 1, wherein in the second filtering condition, the first reference value is at least 1.

4. A system for filtering LiDAR data according to claim 1, wherein in the third filtering condition, the second reference value is at least 1.

5. A method for filtering LiDAR data, comprising:
    storing, by a controller, the LiDAR data in a matrix structure;
    determining, by the controller, whether a first filtering condition for determining whether a point is present within a predetermined reference distance in the LiDAR data is satisfied;
    determining, by the controller, whether a second filtering condition for determining whether a present point adjacent to a left and right by a reference of a reference point in the matrix structure is a first reference value or less is satisfied, when the first filtering condition is satisfied;

determining, by the controller, whether a third filtering condition for determining whether a present point adjacent to a top and bottom by the reference of the reference point is a second reference value or less are satisfied, when the second filtering condition is satisfied;

determining, by the controller, the reference point satisfying the first filtering condition, the second filtering condition, and the third filtering condition as a noise point;

eliminating, by the controller, the noise point in the LiDAR data; and storing, by a storage, the LiDAR data when the noise point is eliminated.

6. A method for filtering LiDAR data according to claim 5, wherein in the first filtering condition, the predetermined reference distance is within about 10 m from the LiDAR, in the second filtering condition, the first reference value is at least 1, and in the third filtering condition, the second reference value is at least 1.

7. A non-transitory computer readable medium containing program instructions executed by a controller, the computer readable medium comprising:

program instructions that store the LiDAR data in a matrix structure;

program instructions that determine whether a first filtering condition for determining whether a point is present within a predetermined reference distance in the LiDAR data is satisfied;

program instructions that determine whether a second filtering condition for determining whether a present point adjacent to a left and right by a reference of a reference point in the matrix structure is a first reference value or less is satisfied, when the first filtering condition is satisfied;

program instructions that determine whether a third filtering condition for determining whether a present point adjacent to a top and bottom by the reference of the reference point is a second reference value or less are satisfied, when the second filtering condition is satisfied;

program instructions that determine the reference point satisfying the first filtering condition, the second filtering condition, and the third filtering condition as a noise point;

program instructions that eliminate the noise point in the LiDAR data; and program instructions that store the LiDAR data when the noise point is eliminated.

8. The non-transitory computer readable medium of claim 7, wherein in the first filtering condition, the predetermined reference distance is within about 10 m from the LiDAR, in the second filtering condition, the first reference value is at least 1, and in the third filtering condition, the second reference value is at least 1.

* * * * *